(12) United States Patent
Krug et al.

(10) Patent No.: US 10,819,678 B2
(45) Date of Patent: Oct. 27, 2020

(54) DATA NETWORK ADDRESS SHARING BETWEEN MULTIPLE ELEMENTS ASSOCIATED WITH A SHARED NETWORK INTERFACE UNIT

(71) Applicant: BRITISH TELECOMMUNICATIONS PUBLIC LIMITED COMPANY, London (GB)

(72) Inventors: Anne-Louise Krug, London (GB); Peter Willis, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 79 days.

(21) Appl. No.: 16/325,007

(22) PCT Filed: Jul. 27, 2017

(86) PCT No.: PCT/EP2017/068991
§ 371 (c)(1),
(2) Date: Feb. 12, 2019

(87) PCT Pub. No.: WO2018/036746
PCT Pub. Date: Mar. 1, 2018

(65) Prior Publication Data
US 2019/0190885 A1 Jun. 20, 2019

(30) Foreign Application Priority Data

Aug. 24, 2016 (EP) .................................... 16185564
Aug. 24, 2016 (GB) .................................... 1614456

(51) Int. Cl.
*G06F 15/16* (2006.01)
*H04L 29/12* (2006.01)
(Continued)

(52) U.S. Cl.
CPC .... *H04L 61/2517* (2013.01); *H04L 29/12367* (2013.01); *H04L 29/12377* (2013.01);
(Continued)

(58) Field of Classification Search
CPC ........... H04L 61/2517; H04L 29/12367; H04L 29/12377; H04L 61/6063; H04L 61/2514;
(Continued)

(56) References Cited

U.S. PATENT DOCUMENTS 7,031,275 B1 4/2006 Borella et al.
7,228,337 B1 * 6/2007 Bornstein ......... H04L 29/12367
709/217

(Continued)

FOREIGN PATENT DOCUMENTS

WO 2012/056010 5/2012
WO 2015/147943 10/2015

OTHER PUBLICATIONS

International Search Report for PCT/EP2017/068991 dated Sep. 25, 2017, 4 pages.
(Continued)

*Primary Examiner* — Liang Che A Wang
*Assistant Examiner* — Johnny B Aguiar
(74) *Attorney, Agent, or Firm* — Nixon & Vanderhye P.C.

(57) ABSTRACT

A connection (5) to a first network (3, 13) is connected by way of a first routing processor (4) to a switching processor (14), which has a connection (35) to a network address translation processor (17) providing access to one or more hosted functions (22). Connections (6, 25) separate from the network address translation processor (17) are made to one or more hosted functions (9, 16, 23), incompatible with the NAT process, and also to a second network (2). This allows connections not requiring NAT to avoid the delays incurred by that process. Data packets are routed to the network (Continued)

address translation processor (17) or the first routing processor (4) in accordance with header information in the packet identifying a transmission control processor (17) and the second interface (35).

16 Claims, 8 Drawing Sheets (51) Int. Cl.
H04L 29/06 (2006.01)
H04L 12/46 (2006.01)
H04L 29/08 (2006.01)

(52) U.S. Cl.
CPC ...... H04L 61/2514 (2013.01); H04L 61/6063 (2013.01); H04L 12/46 (2013.01); H04L 29/0653 (2013.01); H04L 61/256 (2013.01); H04L 67/2842 (2013.01); H04L 69/22 (2013.01)

(58) Field of Classification Search
CPC ... H04L 61/256; H04L 69/22; H04L 29/0653; H04L 12/46; H04L 67/2842
USPC .......................... 709/238, 245; 370/392, 401
See application file for complete search history.

(56) References Cited

U.S. PATENT DOCUMENTS

| | | | | |
|---|---|---|---|---|
| 8,289,968 | B1* | 10/2012 | Zhuang | H04L 61/2517 370/252 |
| 9,154,415 | B1* | 10/2015 | Fulli | H04L 45/74 |
| 2006/0034296 | A1 | 2/2006 | Talucci | |
| 2006/0224774 | A1* | 10/2006 | Tanji | H04L 29/12018 709/245 |
| 2009/0287848 | A1* | 11/2009 | Kamura | H04L 69/22 709/246 |
| 2010/0107162 | A1* | 4/2010 | Edwards | H04L 45/58 718/1 |
| 2010/0303078 | A1 | 12/2010 | Karir | |
| 2012/0063458 | A1* | 3/2012 | Klink | G06F 9/45558 370/392 |
| 2012/0254464 | A1* | 10/2012 | Armstrong | H04L 69/329 709/238 |
| 2012/0317637 | A1 | 12/2012 | Huang | |
| 2015/0263946 | A1* | 9/2015 | Tubaltsev | H04L 49/354 370/392 |
| 2018/0167313 | A1* | 6/2018 | Qiao | H04L 45/64 |
| 2018/0167320 | A1* | 6/2018 | Huang | H04L 61/2592 |

OTHER PUBLICATIONS

Written Opinion of the ISA for PCT/EP2017/068991 dated Sep. 25, 2017, 6 pages.
International Preliminary Report on Patentability for PCT/EP2017/068991 dated Oct. 8, 2018, 13 pages.
Search Report for GB1614456.0 dated Feb. 27, 2017, 4 pages.
Search Report for EP16185564 dated Feb. 7, 2017, 5 pages.
Bush et al., "The Address plus Port (A+P) Approach to the IPv4 Address Shortage; rfc6346.txt", Aug. 26, 2011, pp. 1-38.
Black EMC J Hudson Independent L Kreeger Cisco M Lassere Independent T Nartin IBM D: "An Architecture for Data Center Network Virtualization Overlays (NVO3); draft-ietf-nvo3-arch-07. txt", Aug. 16, 2016, pp. 1-33.
Rees et al., "PE-ARP: Port Enhanced ARP for IPv4 Address Sharing", Internet Citation, Sep. 30, 2009, pp. 1-14.

* cited by examiner

DATA NETWORK ADDRESS SHARING BETWEEN MULTIPLE ELEMENTS ASSOCIATED WITH A SHARED NETWORK INTERFACE UNIT

This application is the U.S. national phase of International Application No. PCT/EP2017/068991 filed Jul. 27, 2017 which designated the U.S. and claims priority to EP Patent Application No. 16185564.8 filed Aug. 24, 2016 and GB Patent Application No. 1614456.0 filed Aug. 24, 2016, the entire contents of each of which are hereby incorporated by reference.

BACKGROUND AND SUMMARY

This invention relates to a method to share a single public IP address between multiple (software) elements associated with a shared network interface unit, for example connecting a private local area network (LAN) to a public network such as the Internet.

Traditionally, different network functions were provided as individual pieces of equipment each with their own individual interfaces, but software running on the hardware can now be used to control all the hardware, including all the network interfaces. Examples of such functions are firewalls, routers and performance monitoring. These functions are typically provided in a chain that data traffic traverses before reaching its end destination. Today, these functions can be provided as software functions that can co-exist on commodity hardware. This reduces costs and speeds up service provision as there is no need for a technician to visit a site to install bespoke hardware. This trend is known as Network Function Virtualisation or NFV.

The hardware operating the network functions may also operate functions independent of the virtual network functions, such as mail or web servers, IOT ("internet of things") gateways, etc. it is also possible to make virtual (software) versions of other lower level devices such as switches or bridges. One example of this is the OpenVSwitch (OvS), which has a versatile Application Programming Interface (API) allowing fine control of the layer 2 data-paths.

The functions to be virtualised are most typically instantiated with some degree of isolation between them. Thus they may be within virtual machines (VM), in which the software representation makes the function operate as if it were a physically separate item. Lighter weight virtualisation techniques, such as "containers" (isolated network namespaces with associated security features such as control groups), or unikernels, may also be used. The commonality is that the host software (and other virtualised items) have limited visibility of the virtualised item, and that the virtualised item has limited visibility of the host.

Figure 7:
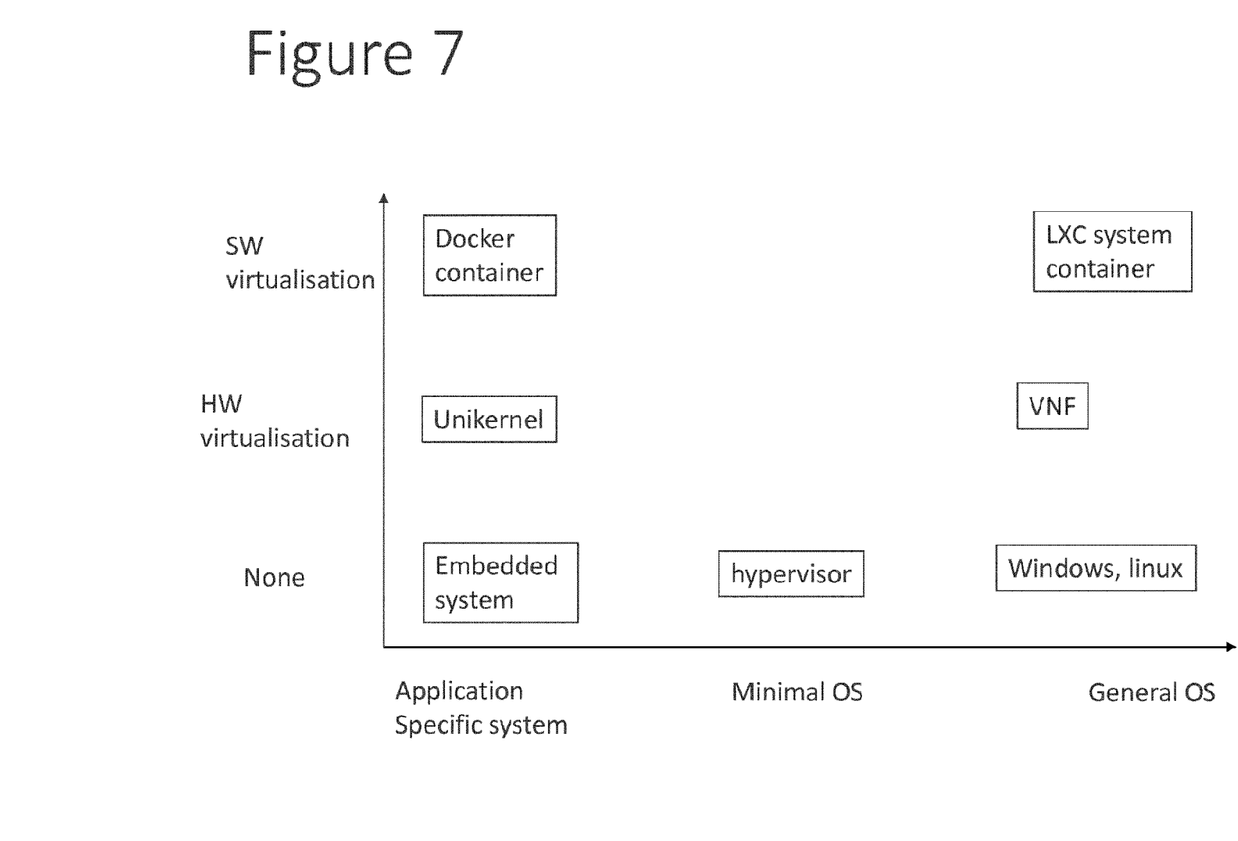
FIG. 7 is a diagrammatic representation of the variation of the degree of virtualisation possible with the generality or specificity of the system.

As illustrated in FIG. 7, the degree of virtualisation abstraction can vary from none (interface direct to the hardware), through hardware virtualisation (normal virtualisation, the interface presented to the next layer is a hardware interface) to software virtualisation (in which software constructs such as namespaces are used to isolate the components). The types of system that are run within the isolation can vary from application-only to generalised operating systems. Systems designed to run on generalised operating systems are easier to develop, but with several levels of abstraction and indirection they may have inferior run-time performance characteristics compared with more specialised single-purpose systems. Virtual Machines give good isolation but are wasteful of resources and slow to instantiate.

The key characteristic of these is that the processes and rules inside any element are to some extent isolated (i.e. not visible) from other elements Data traffic is sent between network functions (be they hardware or software) by connecting individual networks (known as subnets) together to make what is known as the Internet. Routers connect the different networks together by building routing tables that indicate the next hop towards the destination. The Border Gateway Protocol (BGP) is a common protocol for building such routing tables. All devices (or network functions) within a network are able to reach each other without needing data to be routed. This means that all devices within a network are either directly wired to each other or all have access to the same shared transmission media (eg WiFi, or Ethernet bridges or a bus). All nodes on the shared media have an address recognised by the shared media—eg an Ethernet address (also called a MAC or Media Access Control address) in addition to the IP address.

Figure 8:
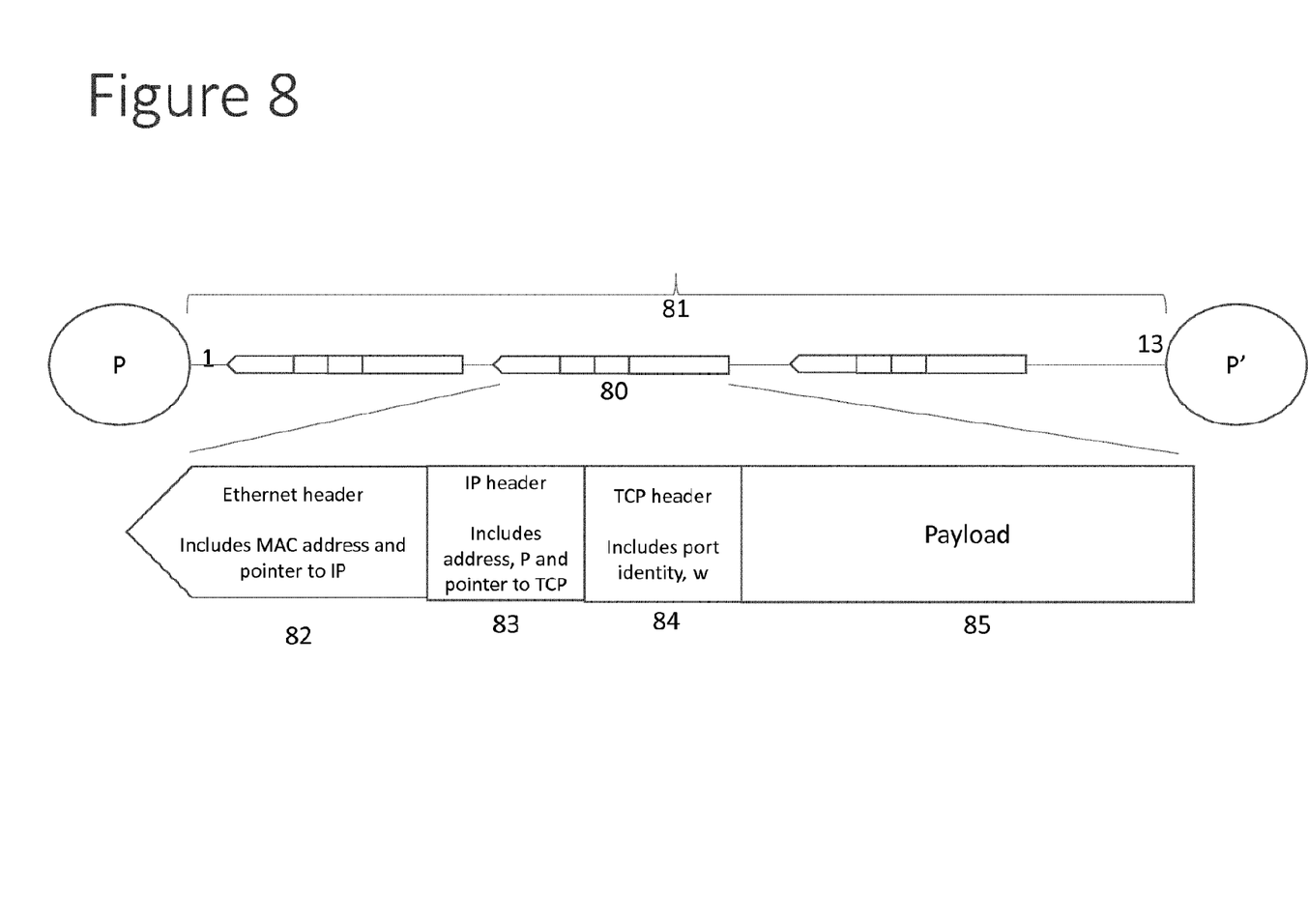
FIG. 8 is a schematic representation of a data packet, illustrating the various levels of address information used at different functional levels.

FIG. 8 depicts a typical data packet 80 illustrating pertinent addressing header information in respect of the data ports at the various network layers. Each network layer defines interfaces as ports. For example, there are physical Ethernet ports connecting hardware to wide area networks (WAN) and local area networks (LAN). There are also virtual Ethernet ports, and Ports are also defined at internet protocol (IP) and TCP/UDP level, In FIG. 8, a packet 80 contains multiple headers 82, 83, 84 ahead of the payload 85: each header identifies a port at a different level, respectively identifying an address at the appropriate layer. The physical layer (81) carries the entire packet over the physical media (eg an Ethernet cable or a computer internal memory access) and the physical media itself identifies the correct output port (eg a cable is connected to specific ports P, P' in respective hardware components (1, 13). For the other layers, the header 82 identifies the Ethernet Address, the header 83 identifies the IP address and the 84 header identifies the TCP/UDP port. Ports (or addresses) identify a specific element within that layer of communications. Additionally, each layer header will indicate the nature of the next layer. Thus the IP layer 83 will indicate which IP element the packet is destined for, and that once it reaches that IP element the IP header will indicate that it should be processed by eg TCP, with the TCP header 84 indicating the required TCP item.

Each stage of the routing process directs the packet to the next stage according to the header information appropriate to that stage and any internal rules.

To send a data packet, each node first determines whether the destination IP address is on the same network. If the destination is on the same subnet, it can be reached directly. If the destination belongs to another network, the packet is sent to a router, at a predetermined next-hop IP address. The router is on the same subnet as the node, as well as on other subnets. Assuming an Ethernet network, an ARP (Address Resolution Protocol) message is then typically broadcast to all nodes in the Ethernet network asking which Ethernet Address is associated with IP address N, where IP "Address N" is ether the destination IP address or the next-hop router IP address. The node with the IP address replies directly to the source Ethernet Address that it holds the IP address which is the subject of the request. This ARP mapping is cached for a short while to allow routing of future packets. The node then takes the IP packet and formats it as an Ethernet packet with its Ethernet Address as the source MAC and the destination Ethernet address as the destination MAC. The data is then transmitted over the physical link and it will be received by the correct host.

Although ARP broadcast is typically used to discover hosts, all systems will note the MAC and IP address of any incoming packet and update the ARP cache accordingly. This means that conflicts between ARP responses could occur if two devices each holding the same IP address were both to communicate with the node within a small period of time.

In order to correctly route a packet, it is necessary for each node in the communications network to be able to determine whether the target IP address belongs to the same local network, or needs to be reached by way of a router. All devices in a network have a 32-bit IP address that is made up of two parts: a network part and a host part. The IP address is generally represented as four octets of binary digits, the individual octets being conventionally rendered as their decimal equivalents (each being in the range 0 to 255). In the fourth octet, the values 0 and 255 (all-zeroes and all-ones) are reserved for the network address and broadcast address. The subnet mask indicates how many of the binary digits (bits) of the 32-bit address relate to the identity of the network, with the remainder relating to the specific host identity within that network. Thus, for a machine with an IP address configured as 192.168.0.1/24, the IP address is 192.168.0.1 and its subnet mask is 24. Thus the network part is the first 24 bits (three octets) of the address 192.168.0, and machines in the network can have addresses from 192.168.0.1 to 192.168.0.254. (Omitting 192.168.0.0 and 192.168.0.255 which are reserved as explained above). Bigger physical networks will have smaller subnet masks, because less of the address space is used to indicate the network and more is used to indicate the specific hosts within the network. Conversely, in a "/30" network, (subnet mask is/30) there are only two usable addresses. In the embodiment to be described (FIG. 6) these are the address P of a public-facing physical port 5, and the address N of a port 6 to which is connected a private local area network (LAN) 2.

It is desirable to be able to provide a virtualised routing function that can sit on a branch location which only has a /30 address for its external link, or even just a single /32 management loopback address, which is not assigned to a physical interface. However, this can be difficult as there is only one public address available for all destinations reached through the host, including network functions such as a virtual router, the destinations served by any virtual routers, any other network functions and virtual functions on the host, as well as all the software processes and functions of the host itself.

Although the design of the internet presupposed that all IP addresses were publicly routable, a combination of address shortage and security & privacy concerns led to the development of Network Address Translation (NAT). This is a process which maps IP addresses. One-to-one mapping may simply switch a private IP address for a publicly routable one. More common is mapping one public address to many private addresses, which uses connection tracking to ensure that returning flows reach the intended destination. Addresses can be static or dynamically assigned. However, NAT introduces complications for some applications—for example any application that uses its IP address as part of a security mechanism will fail, as the end host is not explicitly aware of NAT.

NAT also requires IP address translations which are computationally intensive, and therefore slow. Also, there needs to be a mechanism to ensure that services that need to do so can advertise their reachable IP address (the default is to advertise the NAT-configured IP address). Certain services are therefore incompatible with NAT, for example management and monitoring purposes, e.g for Border Gateway Protocol, (BGP) or access of a remote machine using the http (hypertext transfer protocol) Web protocols.

Figure 1:
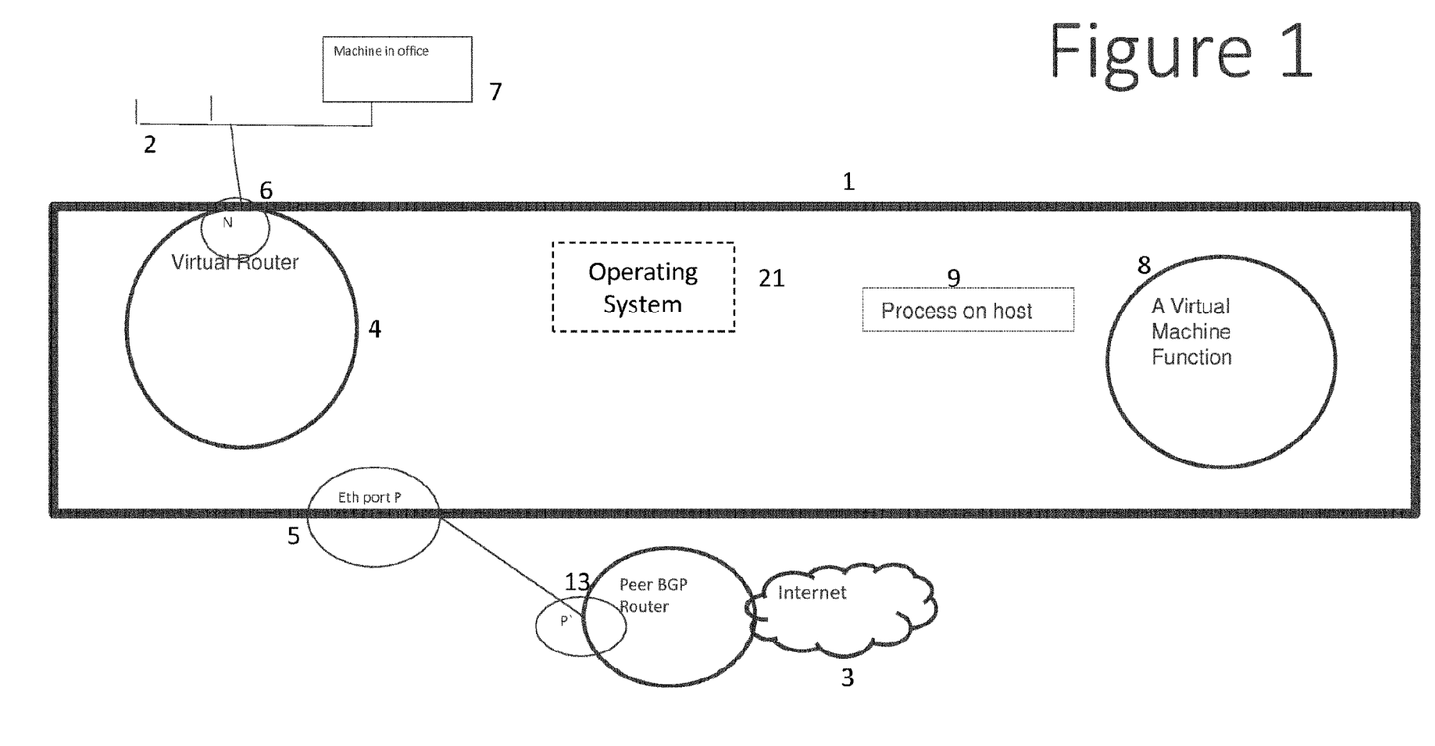
FIG. 1 depicts the functional elements of a basic prior art system in which a router hosted on a host device is used to connect an office LAN to the Internet through a host device.

FIG. 1 shows a standard computer 1 operating as a host for a number of applications, and used to connect an office LAN 2 to the Internet 3. This hosts virtualised services, including a routing function within a virtual machine 4.

The computer has two physical interfaces 5, 6. A public-facing physical interface 5 is plugged into the external connection and connects with the Internet 3 through a peer Border gateway protocol router 13. The computer is assigned only a single IP address, P, by the Internet Service Provider. The other interface 6 connects to the site LAN 2 (using address space N). This interface 6 is directly associated with the virtual router 4 through the virtualisation software.

The problem is how to use the single public facing interface 5 to provide connectivity for all the elements in the system, including any devices 7 connected to the LAN 2, any virtual machines 8 or other processes 9 hosted on the computer 1.

Figure 2:
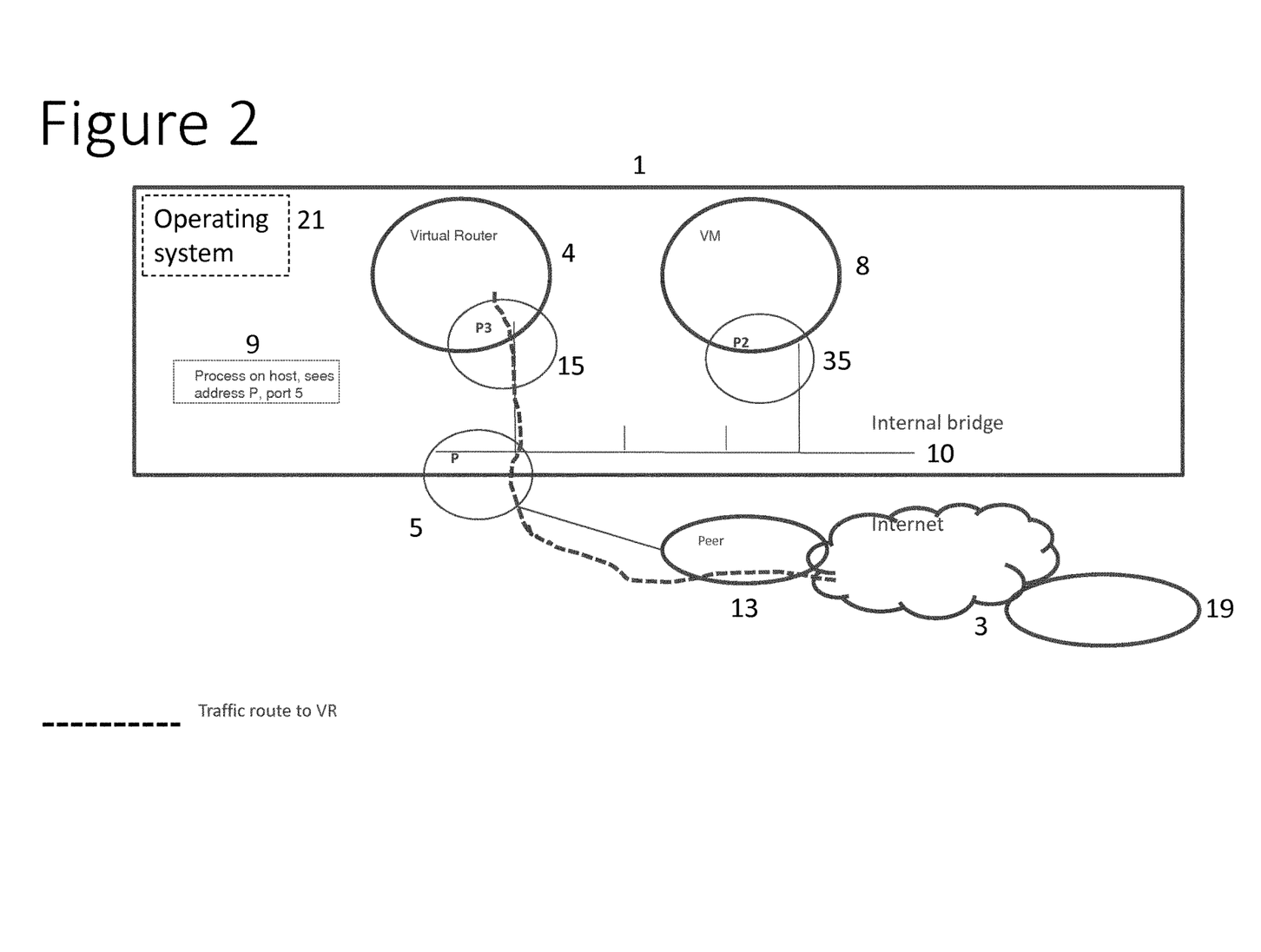
FIG. 2 depicts the functional elements of a prior art arrangement requiring one public-side interface but multiple public IP addresses for the router and other devices hosted on the host device
Figure 3:
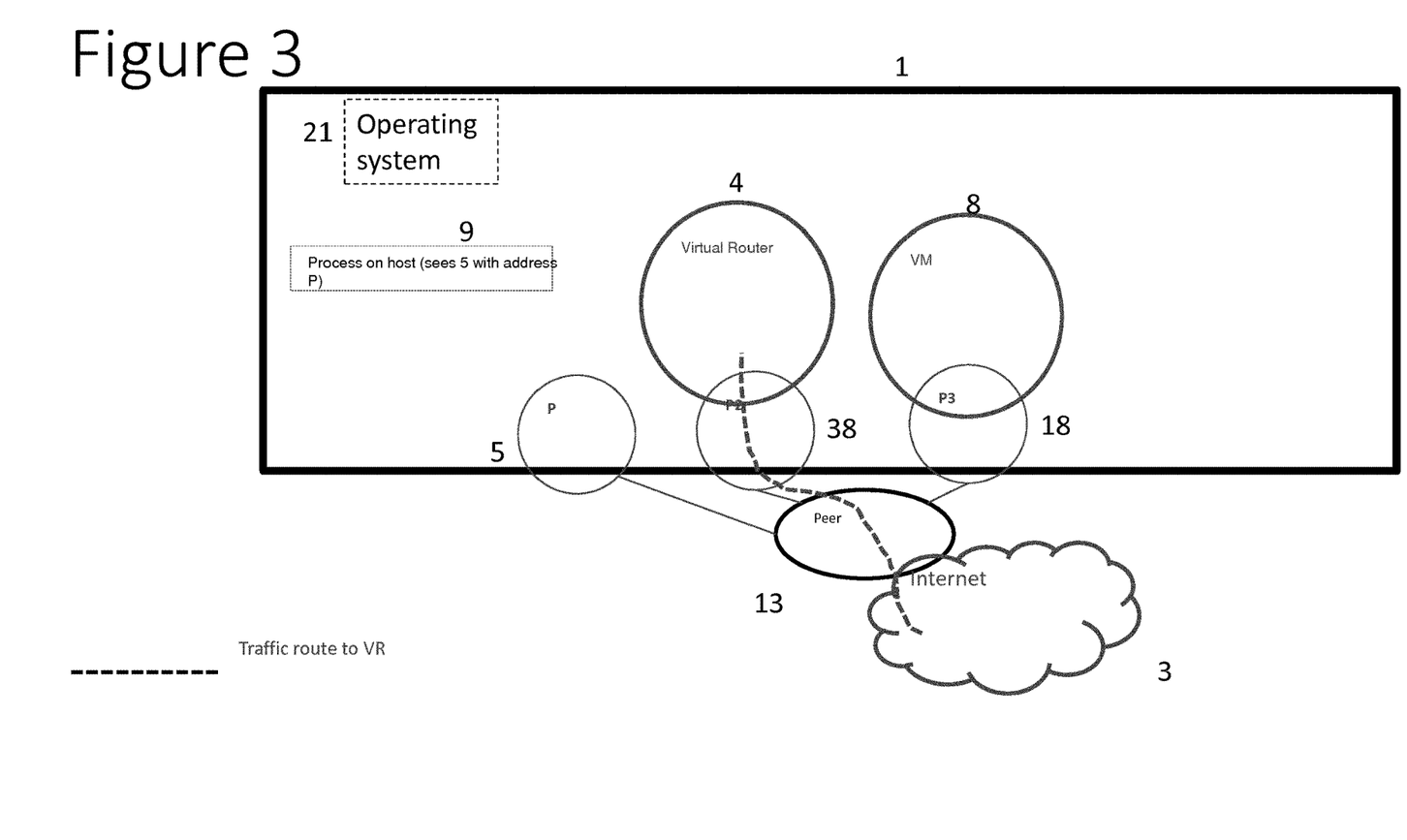
FIG. 3 depicts the functional elements of a prior art arrangement requiring a host device having multiple public-side interfaces and associated IP addresses for each function of the host device
Figure 4:
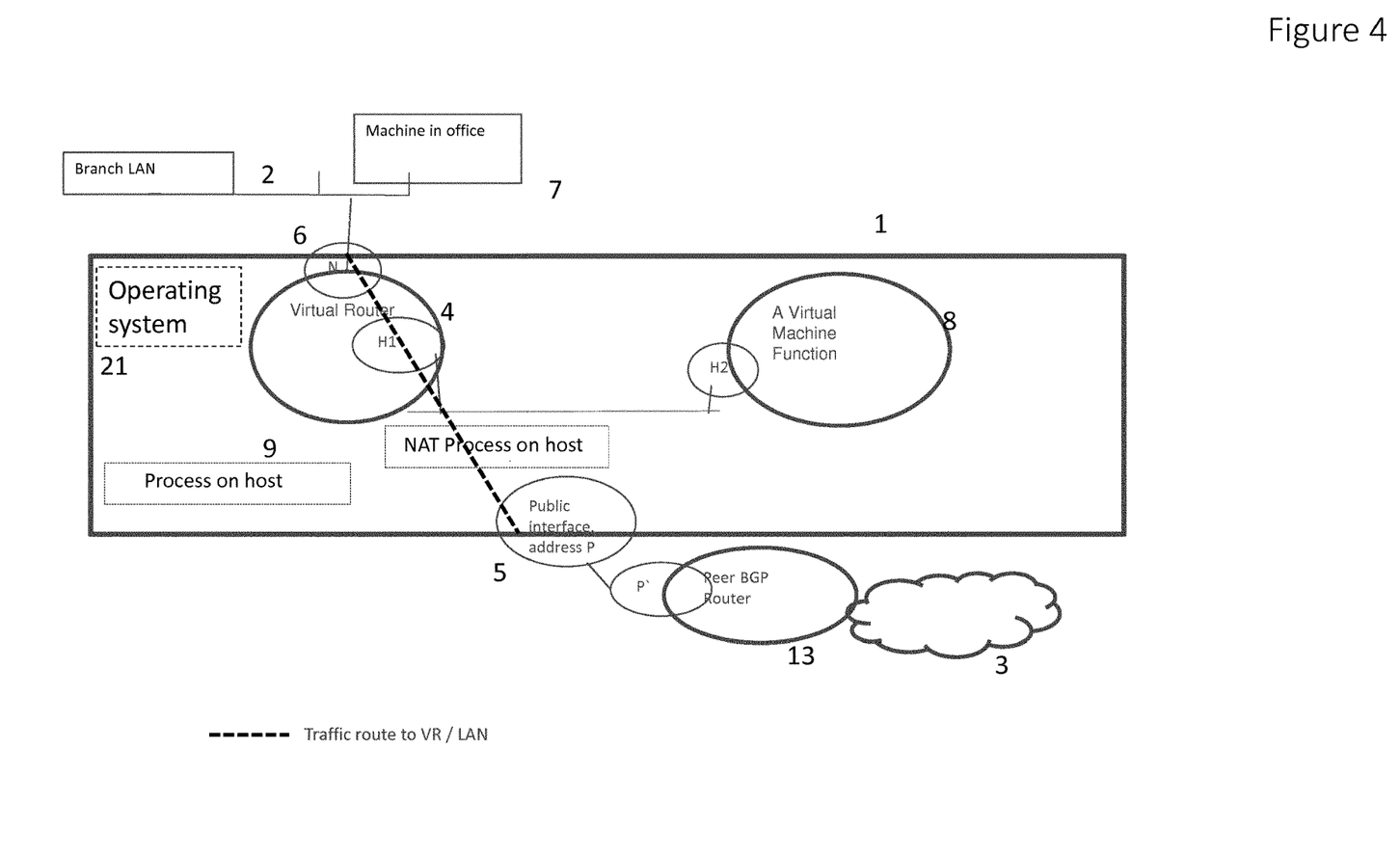
FIG. 4 depicts the functional elements of a prior art arrangement requiring one public-side interface, in which the host device uses network address translation to direct traffic to the router and other functions hosted on the device

FIGS. 2, 3 and 4 show some ways that Virtual Machines (containers, unikernels, and separate namespaces) are currently connected. FIGS. 2 and 3 assume multiple IP addresses are available, whereas FIG. 4 shows the standard solution for single address.

In FIG. 2 the computer 1 has many public facing IP addresses. With one physical interface 5, the computer 1 could provide an internal bridge function 10 and give each Virtual machine 4, 8 a respective virtual interface 15, 35 to connect to the bridge 10. Each of those interfaces would have its own respective public IP address P2, P3. In this case, the host's operating system 21 owns address P and its processes 9 can therefore use address P, whilst other Virtual machines 4, 8 have addresses P2, P3 from the same subnet as P FIG. 3 shows an alternative arrangement in which there are as many physical interfaces 5, 38, 18 as IP addresses P, P2, P3; each physical interface being directly associated with a single Virtual machine 4, 8 or with the host operating system 21. This arrangement is only practical if multiple interfaces 5, 38, 18 are available.

FIG. 4 shows a system making use of Network Address Translation (NAT). Like the arrangements in FIGS. 1 and 2 (but not FIG. 3) this again uses a single network-facing interface 5, and as before, the host operating system 21 can use the Public Address P for its communications. Virtualised elements 4, 8 are given virtual interfaces with addresses H1, H2 etc from a private (Hidden, H) address range. Hence the computer 1 must provide a routing function between the actual interface with public address P and the virtual element with hidden address H. Therefore, all communications from the Virtual machines pass through a network address translation process operated by the operating system 21. To simplify management of the virtual interfaces, the host may use a bridge for the interfaces associated with the hidden (H) addresses. Further interfaces, 5 could be used to provide services to more elements, but each would need its own internet address.

The NAT process changes the IP addresses of outgoing traffic, substituting the "hidden address" H1, H3, etc by the public address P, and records an association between the hidden address and the address to which packets were sent so that return packets received from the BGP router 13 from that address can be translated back to the same hidden address.

A problem with this arrangement is that not all processes can use NAT. In particular, security policies such as those in the BGP routing process expect a direct peering link. Moreover, any function, 8 that advertises its address externally would be unable to do so as it will not know the public address P. Moreover, the Network Address Translation requires additional processing that will slow data transit.

United States patent specification 2012/063458 describes a system in which Network Address Translation is avoided by permanently allocating a port number to each virtual machine accessed by the router. However, this arrangement is not practical for connection through a Local Area Network.

Figure 5:
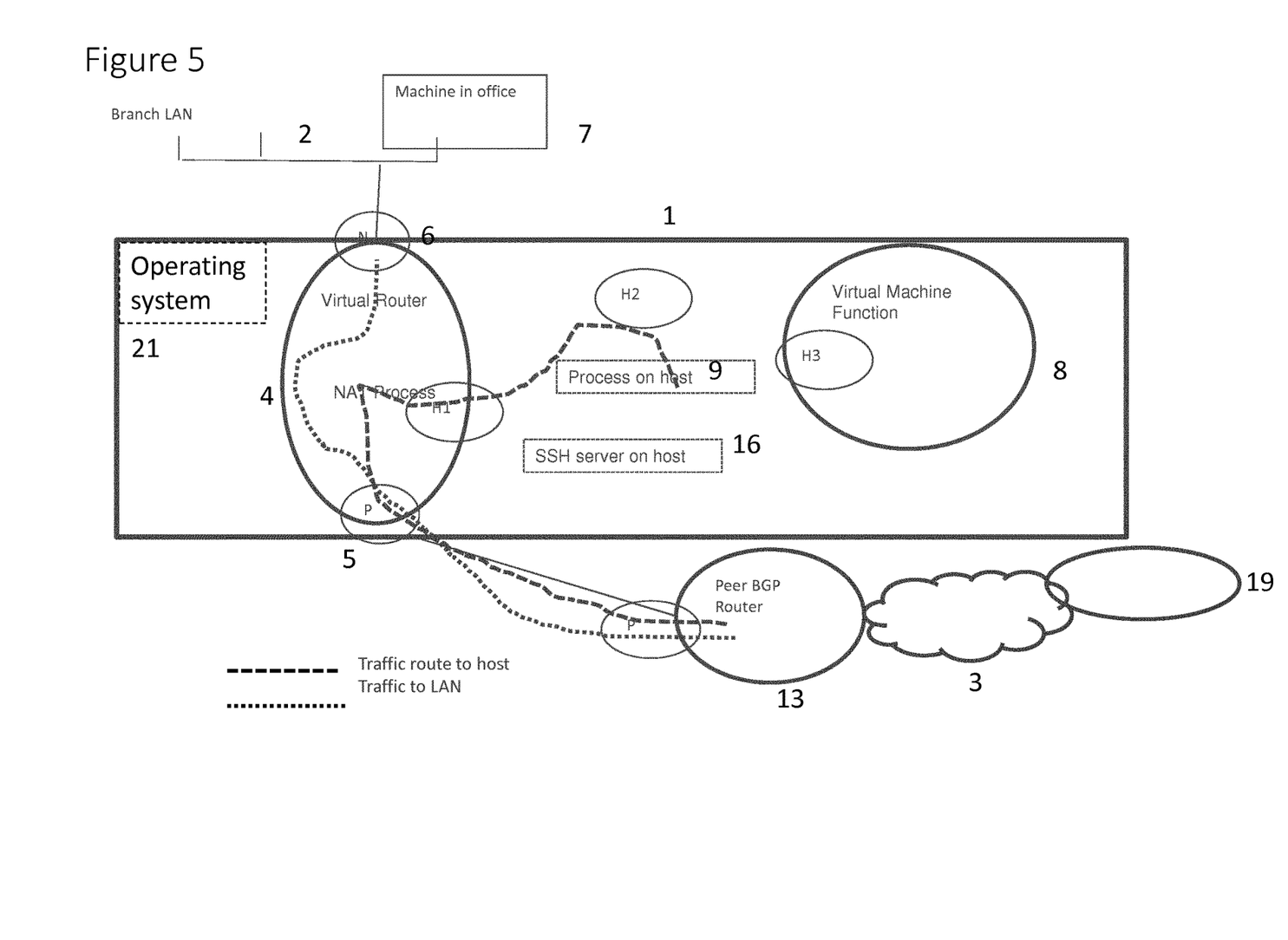
FIG. 5 depicts the functional elements of a prior art arrangement requiring one public-side interface on the host device, in which the router hosted on the device uses network address translation to provide connectivity for functions hosted on the device.

An alternative solution has been proposed which enables a virtual router 4 and a BGP router 13 to function correctly. This is shown in FIG. 5. The public interface 5 and associated IP address P are assigned to the router 4. It is no longer visible to the host operating system 21. This supports direct peering for the BGP service and fast path for the through traffic to the LAN, 2. The virtual router 4 provides a NAT service to enable connectivity to the host 21 and other Virtual machines 8 (as shown), although that then limits the services that can be provided on the host and virtual machines to NAT-compatible ones. In this situation, the hidden addresses are assigned to the host operating system, 21 and other VM functions, 8.

However, this arrangement has a problem that if the software router 4 fails or is corrupted there is no longer access to the host system 21 which, among other things, is necessary in order to attempt to reconfigure the router remotely from the management centre 19 through the internet connection 3 and the Secure Shell (SSH) server 16. Furthermore, no other service 8, 9 can have access to the internet without being subject to network address translation.

It is also possible, as disclosed by Bush et al "*The address-plus-port approach to the IPv4 address shortage*" (IETF, 2011), to run a protocol between each virtual machine and the router to establish a translatable address, but this requires special programming to be installed in each virtual machine.

According to a first aspect of the present invention, there is provided a device for connection between a first data network and a second data network, and hosting one or more functional elements accessed through an internal bridge, the device comprising a first interface through which the device can be connected to the first network, the device incorporating a first routing processor through which the device can be connected to a first port to provide access to a plurality of network addresses through the second network, wherein the first routing processor is connected to the first interface through a switching processor, the switching processor having a second interface comprising a first set of ports, independent of the first routing processor, connected to a network address translation processor providing access to one or more hosted functions associated with respective members of the first set of ports and compatible with a network translation process, the switching processor being arranged to route data packets to the network address translation processor or the first routing processor in accordance with header information in a packet identifying a transmission control port, and the device having a third interface comprising a second set of ports, connected independent of the network address translation processor or the second interface, the second set of ports providing access to one or more additional functional elements hosted on the device.

According to a second aspect, the invention provides a process for providing a communications connection between a first network and a plurality of network addresses accessible through a second network, in which a first connection to the first network and a second connection to the second network are made through respective ports connected by way of a first routing processor, wherein the first routing processor is connected to the first connection through a switching processor, the switching processor having connections independent of the first routing processor, through further ports, to one or more hosted functions a network address translation processor providing access to one or more of the hosted functions associated with a first set of ports, data packets being routed to the network address translation processor or the first routing processor in accordance with header information in the packet identifying a transmission control port, and wherein one or more of the hosted functions are associated with a second set of ports independent of the network address translation processor.

The second set of ports, connected independently of the NAT processor, may be used for hosted functions that are incompatible with the NAT process, for example because the network address requires validation at a remote server.

The second interface and the one or more additional functional elements may all be allocated a common public IP address, and the switch be configured to route data traffic to them according to specific data in the packet headers.

The network address translation processor may be in an isolated network namespace, such that traffic can be selectively directed to use or not use the Network Address Translation process.

The switching processor can be arranged to direct data messages with header information specific to a process to be routed to the process so specified, and to route data messages which are not directed to a specified process to be routed only to the first routing processor.

To avoid multiple responses to Address Resolution Protocol broadcast packets, the switching device may be arranged to route them to only the first routing processor, wherein the switching processor is configured to monitor responses to the broadcast packets generated by the virtual router and transmits a report through the first interface in the event that such responses cease being received. Alternatively, the switching processor may be arranged to selectively route replies to broadcast messages according to which interface the reply is received from, such that only one reply to a broadcast message is returned to the origin of the broadcast message, and wherein source addresses of replies received from the network address translation processor are re-written to be that of the first routing processor. The switching processor can be arranged to cache Address Resolution Protocol packets and generate replies to the Address Resolution Protocol packets for transmission to the network. Source addresses of replies received from the network address translation processor are re-written to be that of the first routing processor and transmitted to the host device.

The network address translation processor may be connected to a bridging system, through which the associated hosted functions can be connected. It is possible to isolate the hosted functions connected through the NAT processor from the other hosted functions. The switching processor can be arranged to direct data packets received at the physical interface to be directed to the virtual routing device unless specific patterns with the packet header are matched (eg the packets are addressed to the one or more specific TCP ports). In particular, the switching can be arranged so that broadcast packets are selectively directed to one of, or a subset of, the Ethernet ports.

This arrangement allows the hosted elements to use the same public IP address, with specific inbound paths open for services on any of the hosted elements that are incompatible with NAT.

An embodiment of the invention will now be described by way of example with reference to the drawings, and in particular to FIG. 6.

BRIEF DESCRIPTION OF THE DRAWINGS

The drawings are schematic representations, in which FIGS. 1 to 5 illustrate the prior arrangements already discussed, and specifically:

DETAILED DESCRIPTION OF PRESENT EXAMPLE EMBODIMENTS

Figure 6:
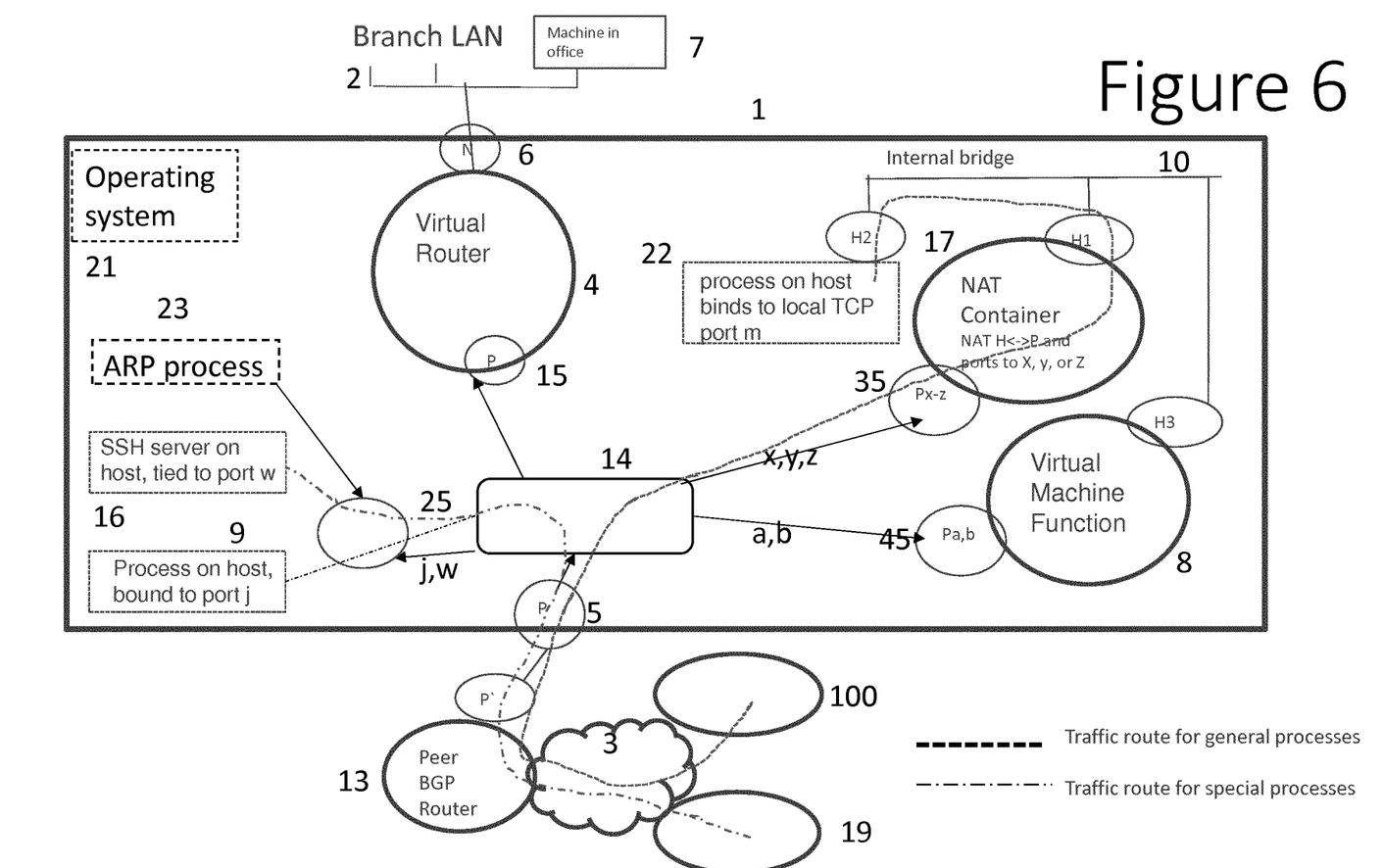
FIG. 6 depicts the functional elements of an arrangement configured according to the invention

The embodiment of the invention depicted in FIG. 6 uses a virtual switch 14 on the device 1. When this is initiated, it operates as a bridge.

The device 1 has two physical Ethernet ports 5, 6, respectively connected to a wide area network (WAN) 3 and a local area network (LAN) 2. The operating system defines virtual Ethernet ports (15, 25, 35, 45), IP ports (P, N, H) and TCP/UDP ports (a, b, j, w, x, y, z). A virtual switch 14 is installed on the device 1, with a public interface 5 and an associated public IP address P. It uses logical Ethernet links with associated logical Ethernet ports, 15, 25, 35, 45 which can be used to connect between itself 14 and any other element expecting an Ethernet port. Each of these Ethernet ports can be assigned IP addresses and could receive Internet Control Message Protocol (ICMP) and IP packets; IP packets received on these Ethernet ports can be directed to specific processes based upon data, such as the TCP port number, carried in IP packet header in accordance with normal packet processing.

The virtual router 4 is connected to the virtual switch 14 through the Ethernet port 15. The public IP address P is applied to Ethernet port 15. There should now be normal connectivity between the outside world and the router.

With the routing established, the branch LAN 2 should also have correct connectivity, without any address translation if the address range N is publicly routable.

Inbound communications and public-address-aware communications can now be established to functions 9, 16, operating on the operating system of the host 1, and to any other components 8, 17 on the system, by creating more links with virtual Ethernet ports 25, 35, 45 between the bridge 14 (switch) and each system. This can be done by creating a virtual pair of linked Ethernet devices associating one end with the switch 14 and the other end with the relevant component (eg the host). The public IP address can be assigned to the Ethernet ports 25, 35, 45

Incoming Ethernet or IP packets having specified data in the header, such as a specified destination MAC address, or DSCP (DiffServ Code Point) codes, are directed by the virtual switch 14 to an associated Ethernet port 25, 35, 45, with a default of routing to the virtual router 4 (port 15) if the header data is not one of the specified codes. In this example, we use TCP port numbers as the additional routing information used by the switch. In this example the destination Ethernet MAC address of any incoming data for logical TCP ports j and w is changed to the MAC address of the end of link 25 associated with the host 1. When received by the system 1 through interface 5, the packet will be correctly routed to the process listening on the TCP ports j (9) and w (16). Such messages may be control messages from a service provider 19 using the SSH service 16, which could for example then be used to configure the system to redirect different TCP ports to different switch links. This in general provides the ability to connect into any process on the host 21 for management purposes without going through the router or to provide other services 9 that require knowledge of their public IP address Similarly Other Virtual Machines (8), containers or unikernels could be installed, all sharing the same public IP address using predefined TCP ports to enable NAT bypass for key services.

Then, to support a requirement for the host or other elements (eg VM 8) to run processes that make outgoing connections e.g. for software updates a NAT processor 17 is configured. This must use separate network processing rules to the host 1, router 4 and other VMs, 8. This is achieved by using network namespaces, a virtual machine, a unikernel or, in this embodiment, a container. The NAT processor can be reused by many processes. The NAT function is in a network namespace that is distinct from the host 1 and elements 4 and 8. A container is an easy, lightweight way to achieve this, and ensures good resource sharing between all components.

As before a connection is created between the bridge 14 and an Ethernet port 35 associated with the container 17, and the public address P is applied to the container end of the connection. Further links can then be provided between the container 17 and other hosted processes 22 or the Virtual machine 8, with private ("hidden") network addresses H2, H3 assigned to the ends of those links. An internal bridge 10 (on the host) can be created to manage the multiple connections. Alternatively, point to point connections could be used, or the virtual switch 14 can itself be re-used by creating a set of rules that effectively segregate the public and private networks. This latter arrangement also allows communication between elements on different hosts, provided that all elements can connect to the virtual switch 14. A set of TCP port numbers x,y,z are allocated to the NAT container and the switch 14 is configured to direct communications with those TCP port numbers towards the container. The Network Address Translation function 17 is configured to source-map anything from the hidden addresses H1, H2, H3 to the public address and the specified TCP port range. This changes the IP and (TCP) port numbers of the source fields for outbound traffic, and reverses the process for returning inbound traffic.

The host and other routing tables are suitably configured such that, for example, they will communicate with the network based management nodes 19 directly through the switch 14 (link 25) using IP address P and next hop P', whilst other routings (default route) goes through the network address translation process 17 using next hop address H1. It is therefore possible for the hosted process (e.g 22) to communicate with the outside world through the BGP router 13, using TCP (Transmission Control Protocol) or UDP (User Datagram Protocol) with address H2 and TCP port m.

The operation of the system will now be described.

For inbound communication, the default condition of the switch 14 is that data is directed to the virtual router 4. The incoming hop (peer router 13) looks up the destination IP address of the data in its routing tables, which tells it the next IP hop is P (that includes data addressed to P as well as data for the LAN, address range N). The BGP router 13 transmits an ARP broadcast on the P network to identify the owner of IP address P, and the switch 14 routes this only to the virtual router 4. The router 4 replies to the ARP message and the data is then sent by the BGP router 13 towards P. When the data arrives at physical port 5, the virtual switch 14 (bridge) checks the TCP port number and normally, forwards data to the virtual router 4. However, if the TCP port number is associated with one of the other ports a,b,j,w,x,y,z, the MAC is changed to the relevant destination MAC before forwarding through the associated switch port.

At this stage we have the virtual router 4 and the peer router 13 communicating using IP address P. Specific other inbound services can be established on the host that can be advertised and reached, also using the public address P. These services are reachable even if the router 4 fails. In particular, a network-based function 19 can be used to control operations on the host device 1 to re-instate the routing function 4 should it have stopped operating.

Outbound communications from the Virtual Router 4 work as normal, as the default is that all returning traffic goes to the virtual router. For other outbound initiated traffic, the host 1 initiates an application 22 which is connected to a random TCP port m to pull data from a TCP port on the Update Server 100.

To transmit data from a process 22 to the external address of the update server 100, the next hop known by the host operating system 21 is the NAT container (address H1), using the local address H2. The host operating system sends an ARP message on the H1/2 link/bridge to retrieve the MAC address for H1. The NAT container replies with the MAC address on H1, the host then forwards the IP packet from the processor 22 to H1. The NAT container sees its next hop is P' and runs its NAT rules, by changing the source IP address from H2 to P, and changing the source TCP port from m to one of its currently unused TCP ports eg x, and forwarding the packet via the Ethernet port 35 (on the same subnet as P') towards the port P'

The external server 100 sends data back with destination P and destination TCP port x. As TCP port identity "x" is not a default TCP port but is associated with virtual Ethernet port 35, the switch 14 forwards the data to the Ethernet port 35, connected to the NAT container 17. The NAT performs a reverse translation, changing the destination to H2, m and forwards the packet as normal.

We now have the ability for the host 1 to perform general housekeeping actions, such as downloading application updates, without the need to encode specific rules on the switch 14 for each possible communication. This avoids any conflicts that could occur in bridge settings eg if both the host 1 and the Virtual Router 4 need to perform the same operating system upgrade from the same destination.

The host 1 may operate functions that can monitor the communications activity of the other functions so that it can take local action if something fails (liveness monitoring). In particular, if the virtual router 4 were to fail, it will stop advertising via BGP the IP address P to the peer router 13. Some networks 3 rely on that advertisement to simplify the configuration of the peer router 13. For any communication to be monitored, a rule is applied to the switch 14 so that the switch starts recoding data about the flow. A process is run on the host operating system 21 which queries the switch 14 at regular intervals and checks that the packet count has increased for the flow in question. If the packet count has not increased, the process has failed. A new BGP process can be initiated, on host 21, because the BGP peer will time out and reset a connection if it doesn't hear "keep" alive messages, so a local Border Gateway Protocol process can be initiated that tells the peer 13 the location of the physical port associated with IP address P. This may be used to modify local routing tables, links or the switch rules.

The switch 14 can be queried to detect when the outbound packet count starts to increase again, indicating that the Virtual Router 4 has started to send data again. When the next message is heard, the emergency process is closed and the virtual router recovers normally.

Under normal operation an ARP cache at the peer router 13 is updated on receipt of Address Resolution Protocol broadcast messages, and also whenever it receives a packet from the IP address "P". This could led to the incorrect MAC address being used. There are multiple methods to solve this. An ARP processor 23, connected through the connection 25 (i.e not through the NAT processor (17) or the virtual router (4)) controls how the switching processor 14. There are several possible ways of achieving this:

a) The switch 14 may be configured to constrain external Address Resolution Protocol (ARP) broadcast messages to go only to the router 4. This avoids multiple responses to ARP requests from devices connected to the links 25, 35, 45 but if the VR machine fails, the system becomes unreachable as there will be no ARP replies.

b) Another possibility is to have the switching processor 14 identify multiple replies to ARP broadcast messages and forward only one of them, c) Alternatively the switching processor 14 may cache ARP replies locally and reply to broadcast ARP itself (a form of Proxy ARP).

d) Alternatively, multiple ARP replies could be permitted, and on receiving incoming data packets, the bridge 14 could rewrite the dst_MAC address to the relevant MAC address based on the additional information in the packet header (default router 4). However, preferably only headers for data not going to or through the virtual router are re-written, in order to minimise delay on the path through the virtual router 4.

e) It is also possible to avoid ARP message conflicts by re-writing source MAC addresses from the slow path data (meaning that the remote end 13 never gets conflicting data). Since the destination MAC of slow path data will always be re-written anyway based on the rules, there is no real need for the source MAC to be correct, and this ensures minimal processing on the fast path data.

f) Static Ethernet address resolution protocol entries could be used at the far end (13)

g) The method described above for liveness monitoring of the Virtual Router 4 (and sending BGP messages on failure) could also be used for the ARP messages. (ARP process 23)

Dynamic connections out from the host 1 can be supported by routing via the NAT container 17. Routing tables are easiest to configure if all predefined inbound communications are from known source addresses. ICMP (Internet control message protocol) messages cannot be TCP port mapped, but as indicated other header indicators can be used to trigger the rules, for example a rule can be added that such ICMP messages go to the host 22 or the router 4 or even both, or a rule is added based on specific source IP address.

The invention claimed is:

1. A device for connection between a first data network and a second data network, and hosting one or more functional elements accessed through an internal bridge, the device comprising a first interface through which the device is configured for connection to the first network, the device incorporating a first routing processor through which the device is configured for connection to a first port to provide access to a plurality of network addresses through the second network, wherein the first routing processor is connected to the first interface through a switching processor, the switching processor having a second interface comprising a first set of ports, independent of the first routing processor, connected to a network address translation processor providing access to one or more hosted functions associated with respective members of the first set of ports and compatible with a network address translation process, the switching processor being arranged to route data packets to the network address translation processor or to the first routing processor in accordance with header information in a packet identifying a transmission control port, and the device having a third interface comprising a second set of ports, the second set of ports providing access to one or more additional functional elements hosted on the device, the switching processor being arranged to route data packets to the second set of ports through the third interface independently of both the network address translation processor and the second interface, and the network address translation processor being isolated from the first routing processor and the third interface by provision of a network namespace, a virtual machine, a unikernel or a container, to which traffic is selectively directed if, and only if, the traffic is to use the Network Address Translation process.

2. The device according to claim 1, in which the second interface and the one or more additional functional elements are all allocated a common public Internet protocol IP address, and the switching processor is configured to route data traffic to the second interface and to the one or more additional functional elements according to data in packet headers specific to a process associated with one of the second set of ports.

3. The device according to claim 1, in which the network address translation processor is isolated from the first routing processor and the third interface by provision of the network namespace, to which the traffic is selectively directed if, and only if, the traffic is to use the Network Address Translation process.

4. The device according to claim 1, in which the switching processor is arranged to direct data messages with header information specific to a process to a port associated with the specific process, and to route data messages which are not directed to a specified process only to the first routing processor.

5. The device according to claim 4, in which the switching processor is arranged to route Address Resolution Protocol broadcast packets to only the first routing processor, wherein the switching processor is configured to monitor responses to the Address Resolution Protocol broadcast packets generated by the first routing processor and to transmit a report to a source of the Address Resolution Protocol broadcast packets, through the first interface, in the event that such responses cease being received.

6. The device according to claim 4, in which the switching processor has means for identifying from which interface a reply to a broadcast message is received, and returning only one reply to each broadcast message to an origin of the broadcast message, and wherein source addresses of replies received from the network address translation processor are re-written to be that of the first routing processor.

7. The device according to claim 4 in which the switching processor is arranged to cache Address Resolution Protocol packets and generate replies to the Address Resolution Protocol packets for transmission to the first data network.

8. The device according to claim 4 in which source addresses of replies received from the network address translation processor are re-written to be that of the first routing processor and for forwarding to a host device.

9. A process for providing a communications connection between a first network and a plurality of network addresses accessible through a second network, in which a first connection to the first network and a second connection to the second network are made through respective ports connected by way of a first routing processor, wherein the first routing processor is connected to the first connection through a switching processor, the switching processor having connections independent of the first routing processor, through further ports, to one or more hosted functions a network address translation processor providing access to the one or more hosted functions associated with a first set of ports, data packets being routed to the network address translation processor or the first routing processor in accordance with header information in a packet identifying a transmission control port, and wherein the one or more hosted functions are associated with a second set of ports connected through the switching processor independently of the network address translation processor, and wherein the switching processor routes data packets to the second set of ports through a third interface independently of both the network address translation processor and a second interface; and wherein the network address translation processor is isolated from the first routing processor and the third interface by provision of a network namespace, a virtual machine, a unikernel or a container, to which traffic is selectively directed if, and only if, the traffic is to use a Network Address Translation process.

10. The process according to claim 9, in which the first set of ports and the one or more hosted functions are all allocated a common public internet protocol IP address, and data traffic is routed to the first set of ports and to the one or more hosted functions according to address data specific to each element in packet headers.

11. The process according to claim 9, in which traffic is selectively directed to use or not use the Network Address Translation process by providing the network address translation processor in the network namespace isolated from other address spaces.

12. The process according to claim 9, in which data messages with address header information specific to a process are routed to a port associated with the process so specified, and data messages with header information not directed to a specified process are routed only to the first routing processor.

13. The process according to claim 12, wherein Address Resolution Protocol broadcast packets are routed to only the first routing processor, wherein the switching processor monitors responses to the Address Resolution Protocol broadcast packets generated by the first routing processor and transmits a report to a source of the Address Resolution Protocol broadcast packets, through the first connection, in the event that such responses cease being received.

14. The process according to claim 12, in which only one reply to each broadcast message is returned to an origin of the broadcast message, and wherein source addresses of replies received from the network address translation processor are re-written to be that of the first routing processor.

15. The process according to claim 12 in which Address Resolution Protocol packets are cached and replies to the Address Resolution Protocol packets are generated by the switching processor for transmission to the first network.

16. The process according to claim 12 in which source addresses of replies received from the network address translation processor are re-written to be that of the first routing processor for forwarding to a host device.

* * * * *